United States Patent
Ju et al.

(10) Patent No.: US 9,548,505 B2
(45) Date of Patent: Jan. 17, 2017

(54) FUEL CELL SYSTEM AND METHOD FOR CONTROLLING THE SAME

(71) Applicants: Din-Sun Ju, Hsinchu County (TW); Po-Kuei Chou, Hsinchu County (TW); Tsai-Hsin Cheng, Hsinchu County (TW)

(72) Inventors: Din-Sun Ju, Hsinchu County (TW); Po-Kuei Chou, Hsinchu County (TW); Tsai-Hsin Cheng, Hsinchu County (TW)

(73) Assignee: YOUNG GREEN ENERGY CO., Hsinchu County (TW)

( * ) Notice: Subject to any disclaimer, the term of this patent is extended or adjusted under 35 U.S.C. 154(b) by 754 days.

(21) Appl. No.: 13/743,317

(22) Filed: Jan. 16, 2013

(65) Prior Publication Data
US 2013/0189598 A1 Jul. 25, 2013

(30) Foreign Application Priority Data
Jan. 19, 2012 (CN) .......................... 2012 1 0016342

(51) Int. Cl.
*H01M 8/04* (2016.01)
*H01M 8/06* (2016.01)
*H01M 8/10* (2016.01)

(52) U.S. Cl.
CPC ....... *H01M 8/04089* (2013.01); *H01M 8/0432* (2013.01); *H01M 8/04544* (2013.01); *H01M 8/04574* (2013.01); *H01M 8/04753* (2013.01); *H01M 8/04776* (2013.01); *H01M 8/065* (2013.01); *H01M 8/1011* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 4,098,959 | A | 7/1978 | Fanciullo | |
|---|---|---|---|---|
| 2007/0196700 | A1 | 8/2007 | Chen et al. | |
| 2009/0004512 | A1* | 1/2009 | Sugimoto | B01J 4/008 429/499 |
| 2009/0011300 | A1* | 1/2009 | Yagi | H01M 8/04029 429/410 |
| 2009/0214904 | A1 | 8/2009 | Zhou | |
| 2009/0263687 | A1* | 10/2009 | Yoshizaki | C01B 3/065 429/410 |
| 2011/0189571 | A1* | 8/2011 | Hung | H01M 8/04 429/431 |

FOREIGN PATENT DOCUMENTS

| CN | 102148386 | 8/2011 |
|---|---|---|
| TW | 201004018 | 1/2010 |

* cited by examiner

*Primary Examiner* — Jonathan Crepeau
(74) *Attorney, Agent, or Firm* — Jianq Chyun IP Office

(57) ABSTRACT

A fuel cell system and a method for controlling the fuel cell system are provided. The method includes detecting an output characteristic value of the fuel cell system and controlling the fuel cell system to respectively operate in at least two of a first mode, a second mode and a third mode at different time points according to the detected output characteristic value. Accordingly, the fuel cell system is capable of stably generating electric power, and is adapted to different operation environments.

14 Claims, 7 Drawing Sheets

FUEL CELL SYSTEM AND METHOD FOR CONTROLLING THE SAME

CROSS-REFERENCE TO RELATED APPLICATION

This application claims the priority benefit of China application serial no. 201210016342.3, filed on Jan. 19, 2012. The entirety of the above-mentioned patent application is hereby incorporated by reference herein and made a part of this specification.

BACKGROUND OF THE INVENTION

Field of the Invention

The invention relates to a fuel cell system and a method for controlling the same. Particularly, the invention relates to a fuel cell system capable of stably outputting electric power and a method for controlling the same.

Description of Related Art

Development and application of energy have always been indispensable conditions of human life, however, the development and application of energy may cause increasing damage to the environment. Energy generated through a fuel cell technique has advantages of high efficiency, low noise and pollution-free, etc. which is an energy technology in line with a trend of the times. Types of the fuel cells are diversified, and the commonly used fuel cells are direct methanol fuel cells (DMFC) and proton exchange membrane fuel cells (PEMFC). However, both of the DMFC and the PEMFC generate power through fuel reaction, and fuel quantity and a speed of the fuel reaction may influence performance and stability of the whole fuel cell.

Taking the PEMFC as an example, the PEMFC is composed of a proton exchange membrane, an anode, and a cathode. The anode takes hydrogen as a fuel, and the hydrogen is transported to a flow channel of the anode through a pump and a flux control valve. When the hydrogen is reacted with a catalyst in the anode, heat is produced. The fuel of the anode is reacted with the catalyst to produce hydrogen ions and electrons, and a chemical formula thereof is:

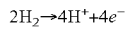

The electrons generated during the anode reaction move to the cathode through a circuit, and the hydrogen ions move to the cathode by penetrating through the proton exchange membrane, and are further reacted with the electrons and oxygen to generate water, and a chemical formula thereof is:

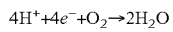

The water generated at the cathode is recycled through a condensation system. On the other hand, since a flow rate of the hydrogen supplied to the anode is required to be stable during the reaction, a complicated valve and a pump are generally required to implement a flux control of the hydrogen.

The hydrogen serving as the fuel could be produced by a general hydrogen producing method and a chemical hydrogen storage technology is widely used in portable electronic devices. The chemical hydrogen storage technology generally produces hydrogen through reaction of a solid-state reactant and a liquid reactant. The solid-state reactant could be metal hydride or metal, for example, $NaBH_4$, $MgH_2$, $CaH_2$ or Al. The liquid reactant includes liquid water, malic acid, citric acid, $H_2SO_4$, $NaHCO_3$, $CaCO_3$, etc. For example, water could be added to sodium borohydride for chemical reaction, so as to produce hydrogen. Then, the produced hydrogen is introduced to the fuel cell to react to generate electric power. Regarding the reaction of the sodium borohydride and water, the water could be added to the sodium borohydride or the sodium borohydride could be added to the water for reaction, and a chemical formula thereof is:

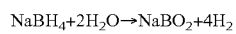

According to the above chemical formula, it is known that the hydrogen could be continually produced in one chemical reaction until the chemical reaction between the solid-state reactant and the liquid reactant is completed. Since the hydrogen generated through the chemical reaction is unstable in flux, a flux control valve is generally used to stably output the hydrogen.

Moreover, when the water is added to the solid-state reactant, a large amount of the hydrogen is released. When the fuel cell receives a large amount of the hydrogen in a short time, an output voltage thereof is increased and a temperature thereof is sharply increased, which causes difficulty in the system control.

Presently, a valve is used to control the output of the hydrogen in order to achieve a precise control, though the valve is quite expansive. Moreover, if the output of the hydrogen is controlled without the valve, following problems are encountered:

1. It is unable to be operated at different ambient temperatures. In case of a low ambient temperature, a large amount of chemical reactions is required to produce hydrogen and maintain the temperature, and in case of a high ambient temperature, logic for controlling the flux of the hydrogen is different due to better reactivity. On the other hand, if the temperature is excessively high, the system is hard to decrease the temperature to an optimal temperature for the fuel cell.
2. The flux of the hydrogen cannot be controlled. A large amount of hydrogen may cause sharp increase of the voltage and temperature, and a small amount of hydrogen results in a low voltage. If there is no good controlling method for the flux of the hydrogen, a service life of the fuel cell is quickly decreased.
3. According to a general control mode, the temperature range of the fuel cell is enlarged, which may cause an excessively high or low temperature. Since the temperature directly influences the performance of the fuel cell in outputting the electric power, a fuel usage rate of the fuel cell is decreased.

Moreover, U.S. Patent Publication No. 20090214904 discloses an integrated fuel and a fuel cell, in which a rate for introducing water or vapor to a solid fuel is controlled by controlling an aperture size and using a film material. Moreover, Taiwan Publication No. 201004018 discloses a fuel supplying method of a fuel cell. In addition, U.S. Patent No. 20070196700 discloses a controlling method for fuel supply.

SUMMARY OF THE INVENTION

The invention is directed to a method for controlling a fuel cell system, by which a rate and quantity of a provided reactant are controlled according to a detected output characteristic value of the fuel cell system, so as to achieve a stable output of the fuel cell system.

The invention is directed to a fuel cell system, which controls a rate and quantity of a provided reactant according to a detected output characteristic value of the fuel cell system, so as to achieve a stable output of the fuel cell system without a valve.

Additional aspects and advantages of the invention will be set forth in the description of the techniques disclosed in the invention.

To achieve one of or all aforementioned and other advantages, an embodiment of the invention provides a method for controlling a fuel cell system. The method includes following steps. An output characteristic value of the fuel cell system is detected, so as to control the fuel cell system to respectively operate in at least two of a first mode, a second mode and a third mode at different time points according to the output characteristic value, where when the fuel cell system operates in the first mode, and the output characteristic value is decreased to a lower limit, a first predetermined quantity of the reactant is supplied to a reaction tank of the fuel cell system. When the fuel cell system operates in the second mode, a second predetermined quantity of the reactant is supplied to the reaction tank at a variable supply rate. When the fuel cell system operates in the third mode, a non-fixed quantity of the reactant is supplied to the reaction tank at the variable supply rate.

An embodiment of the invention provides a fuel cell system. The fuel cell system includes a reaction tank, a supply device, a detection unit, and a micro control unit. The reaction tank is used for a reactant to react therein. The supply device supplies the reactant to the reaction tank. The detection unit detects an output characteristic value of the fuel cell system. The micro control unit is coupled to the supply device and the detection unit, and controls the fuel cell system to respectively operate in at least two of a first mode, a second mode, and a third mode at different time points according to the output characteristic value detected by the detection unit, where when the fuel cell system operates in the first mode, and the output characteristic value is decreased to a lower limit, the micro control unit controls the supply device to supply a first predetermined quantity of the reactant to the reaction tank. When the fuel cell system operates in the second mode, the micro control unit controls the supply device to supply a second predetermined quantity of the reactant to the reaction tank at a variable supply rate. When the fuel cell system operates in the third mode, the micro control unit controls the supply device to supply a non-fixed quantity of the reactant to the reaction tank at the variable supply rate, where the non-fixed quantity is greater than the second predetermined quantity.

An embodiment of the invention provides a method for controlling a fuel cell system. The method includes following steps. An output characteristic value of the fuel cell system is detected, so as to control the fuel cell system to respectively operate in at least two of a first mode, a second mode, and a third mode at different time points according to the output characteristic value, where when the fuel cell system operates in the first mode, before the output characteristic value reaches a lower limit, a first predetermined quantity of a reactant is supplied to a reaction tank of the fuel cell system at a first supply rate. When the fuel cell system operates in the second mode, it is determined whether the output characteristic value is between an upper limit and the lower limit, and a quantity of the reactant supplied to the reaction tank is varied according to a determination result. When the fuel cell system operates in the third mode, a total quantity of the reactant supplied to the reaction tank, is determined, and when the total quantity reaches a predetermined maximum supply quantity, it is stopped supplying the reactant to the reaction tank.

An embodiment of the invention provides a fuel cell system. The fuel cell system includes a reaction tank, a supply device, a detection unit, and a micro control unit. The reaction tank is adapted for a reactant to react therein. The supply device supplies the reactant to the reaction tank. The detection unit detects an output characteristic value of the fuel cell system. The micro control unit is coupled to the supply device and the detection unit, and controls the fuel cell system to respectively operate in at least two of a first mode, a second mode, and a third mode at different time points according to the output characteristic value detected by the detection unit. When the fuel cell system operates in the first mode, before the output characteristic value reaches a lower limit, the micro control unit controls the supply device to supply a first predetermined quantity of the reactant to the reaction tank of the fuel cell system at a first supply rate. When the fuel cell system operates in the second mode, the micro control unit determines whether the output characteristic value is between an upper limit and the lower limit, and controls the supply device to vary a quantity of the reactant supplied to the reaction tank according to a determination result. When the fuel cell system operates in the third mode, the micro control unit determines a total quantity of the reactant supplied to the reaction tank, and controls the supply device to stop supplying the reactant to the reaction tank when the total quantity reaches a predetermined maximum supply quantity.

In an embodiment of the invention, the fuel cell system is a proton exchange membrane fuel cell (PEMFC) system, and the reactant reacts with a fuel in the reaction tank to generate a reaction gas. The fuel cell system further includes a stack for reacting with the reaction gas to generate electric power. The output characteristic value is a temperature of the fuel cell system, a flux of the reaction gas, a pressure of the reaction gas, an output current of the stack or an output voltage of the stack.

In an embodiment of the invention, the fuel cell system is a direct methanol fuel cell (DMFC) system, the reactant is methanol, and the output characteristic value is a temperature of the fuel cell system, an output current of the fuel cell system or an output voltage of the fuel cell system.

In an embodiment of the invention, when the fuel cell system operates in the first mode, and the first predetermined quantity of the reactant is supplied to the reaction tank, if a subsequent peak of the output characteristic value is smaller than a default value, the micro control unit switches the fuel cell system from the first mode to the second mode, where the default value is greater than the lower limit.

In an embodiment of the invention, when the fuel cell system operates in the second mode, and an average of the output characteristic value is greater than the upper limit, the micro control unit controls the supply device to decrease the supply rate, and when the fuel cell system operates in the second mode, and the average of the output characteristic value is smaller than the lower limit, the micro control unit controls the supply device to increase the supply rate.

In an embodiment of the invention, when the fuel cell system operates in the second mode, and the output characteristic value is decreased to a multiple of the lower limit, the micro control unit controls the supply device to supply the second predetermined quantity of the reactant to the reaction tank, where the multiple is greater than one.

In an embodiment of the invention, when the fuel cell system operates in the second mode, if a time interval between two adjacent operations that the supply device supplies the second predetermined quantity of the reactant to the reaction tank is smaller than a predetermined period, the micro control unit switches the fuel cell system from the second mode to the third mode.

In an embodiment of the invention, when the fuel cell system operates in the first mode, if the output characteristic value reaches the lower limit, the micro control unit switches the fuel cell system from the first mode to the second mode.

In an embodiment of the invention, when the fuel cell system operates in the second mode, if the micro control unit determines that the output characteristic value is greater than the upper limit, the micro control unit controls the supply device to decrease the quantity of the reactant supplied to the reaction tank.

In an embodiment of the invention, when the fuel cell system operates in the second mode, if the micro control unit determines that the output characteristic value is smaller than the lower limit, the micro control unit controls the supply device to increase the quantity of the reactant supplied to the reaction tank.

In an embodiment of the invention, when the fuel cell system operates in the second mode, if the output characteristic value is still smaller than the lower limit after the reactant is supplied to the reaction tank for multiple times, the micro control unit switches the fuel cell system from the second mode to the third mode.

In an embodiment of the invention, when the fuel cell system operates in the third mode, if the micro control unit determines that the output characteristic value is smaller than the lower limit, the micro control unit controls the supply device to increase the quantity of the reactant supplied to the reaction tank.

In an embodiment of the invention, when the output characteristic value is smaller than the lower limit, the micro control unit controls the supply device to immediately supply the reactant to the reaction tank.

According to the above descriptions, the micro control unit of the fuel cell system controls a rate and quantity of the supplied reactant according to the detected output characteristic value of the fuel cell system. In this way, the output of the fuel cell system is stabilized without valves, so as to save a fabrication cost. Moreover, the micro control unit controls the fuel cell system to respectively operate in at least two of the first mode, the second mode, and the third mode at different time points according to the output characteristic value, so that the fuel cell system could stably react to generate the electric power, and is adapted to different operation environments.

In order to make the aforementioned and other features and advantages of the invention comprehensible, several exemplary embodiments accompanied with figures are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
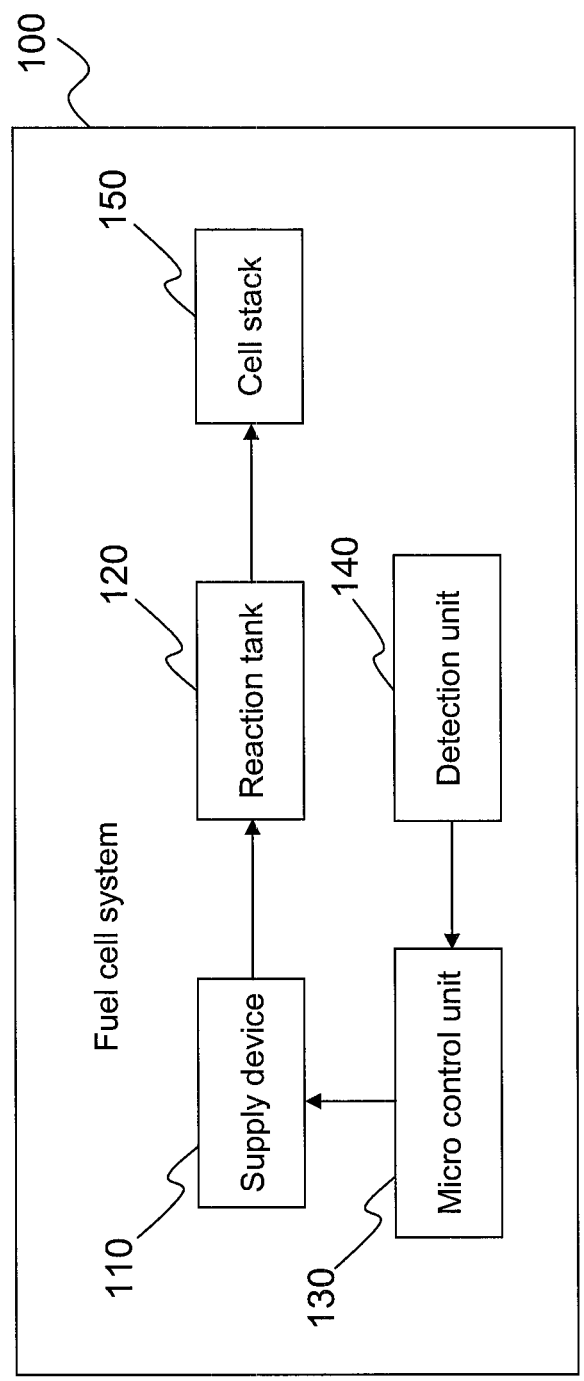
FIG. 1 is a block diagram of a fuel cell system according to an embodiment of the invention.

FIG. 1 is a block diagram of a fuel cell system according to an embodiment of the invention. Referring to FIG. 1, the fuel cell system 100 includes a supply device 110, a reaction tank 120, a micro control unit (MCU) 130, a detection unit 140, and a stack 150. The supply device 110 supplies a reactant to the reaction tank 120. The reactant is processed or reacts with other substances in the reaction tank 120 to produce a corresponding product. The above product is transported to the stack 150 for reaction, so as to produce electric power. The detection unit 140 is coupled to the reaction tank 120 or the stack 150 for detecting an output characteristic value of the fuel cell system 100. The output characteristic value is a physical feature of the reaction tank 120 or the stack 150 detected by the detection unit 140 during operation thereof, and detailed descriptions related to the output characteristic value are introduced below.

In an embodiment of the invention, the fuel cell system 100 is a proton exchange membrane fuel cell (PEMFC) system. The reactant supplied by the supply device 110 reacts with the fuel in the reaction tank 120 to generate a reaction gas (for example, hydrogen). The fuel could be metal hydride or metal, for example, $NaBH_4$, $MgH_2$, $CaH_2$ or Al. The reactant includes liquid water, malic acid, citric acid, $H_2SO_4$, $NaHCO_3$, $CaCO_3$, etc. It should be noticed that the above substances are only used as an example, and the fuel and the reactant could also be other substances capable of generating the similar reaction, which are not limited to the aforementioned substances. The proton exchange membrane in the stack 150 makes the reaction gas to react to produce electric energy. A function of the proton exchange membrane in the stack 150 is known by those skilled in the art, so that details thereof are not repeated. In the embodiment, the output characteristic value could be a temperature of the fuel cell system 100, a flux of the reaction gas, a pressure of the reaction gas, an output current of the stack 150 or an output voltage of the stack 150. Accordingly, the detection unit 140 could be a thermometer, a flowmeter, a pressure gauge, a current meter or a voltmeter for detecting the temperature of the fuel cell system 100, the flux of the reaction gas, the pressure of the reaction gas, the output current of the stack 150 or the output voltage of the stack 150.

In an embodiment of the invention, the fuel cell system 100 is a direct methanol fuel cell (DMFC) system, and the reactant is methanol. The supply device 110 supplies the methanol to the reaction tank 120, and a concentration of the methanol is adjusted in the reaction tank 120, and the reaction tank 120 outputs the methanol solution with adjusted concentration to the stack 150. In this way, the methanol reacts in the stack 150 to generate electric energy. The output characteristic value could be a flux of the methanol supplied to the reaction tank 120 by the supply device 110, a flux of the methanol solution supplied to the stack 150 by the reaction tank 120, a temperature of the fuel cell system 100, an output current of the fuel cell system 100 or an output voltage of the fuel cell system 100. Accordingly, the detection unit 140 could be a thermometer, a current meter or a voltmeter for detecting the flux of the methanol supplied to the reaction tank 120 by the supply device 110, the flux of the methanol solution supplied to the stack 150 by the reaction tank 120, the temperature, the output current or the output voltage of the fuel cell system 100.

The micro control unit 130 controls the fuel cell system 100 to respectively operate in at least two of a first mode, a second mode and a third mode at different time points according to the output characteristic value detected by the detection unit 140. For example, in an embodiment of the invention, the micro control unit 130 controls the fuel cell system 100 to respectively operate in the first mode and the second mode at different time points according to the output characteristic value detected by the detection unit 140. In an embodiment of the invention, the micro control unit 130 controls the fuel cell system 100 to respectively operate in the first mode and the third mode at different time points according to the output characteristic value detected by the detection unit 140. In an embodiment of the invention, the micro control unit 130 controls the fuel cell system 100 to respectively operate in the second mode and the third mode at different time points according to the output characteristic value detected by the detection unit 140. In an embodiment of the invention, the micro control unit 130 controls the fuel cell system 100 to respectively operate in the first mode, the second mode, and the third mode at different time points according to the output characteristic value detected by the detection unit 140. In an embodiment of the invention, the micro control unit 130 controls the fuel cell system 100 to sequentially operate in the first mode, the second mode, and the third mode according to the output characteristic value. It should be noticed that a time sequence that the fuel cell system 100 operates in various modes could be adjusted according to an actual requirement, and a number of times for the fuel cell system 100 being operated in any mode is not limited to one. The first mode, the second mode, and the third mode are described in detail below.

Figure 2:
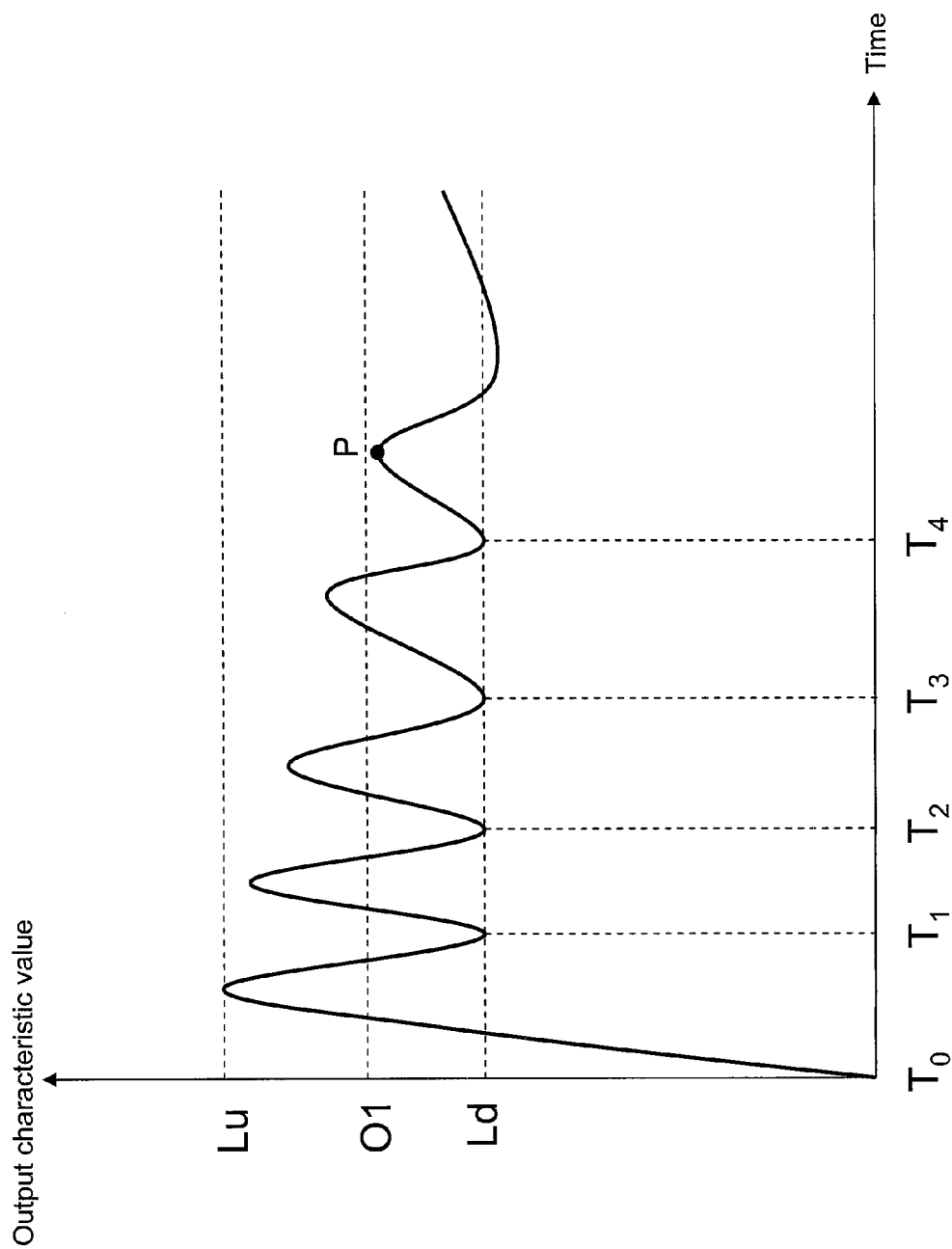
FIG. 2 is a relationship diagram of an output characteristic value versus time when a fuel cell system operates in a first mode according to an embodiment of the invention.

Referring to FIG. 2 and FIG. 1, FIG. 2 is a relationship diagram of the output characteristic value versus time when the fuel cell system 100 operates in the first mode according to an embodiment of the invention. A horizontal axis of FIG. 2 represents the time, and a vertical axis of FIG. 2 represents the output characteristic values detected by the detection unit 140. When the fuel cell system 100 operates in the first mode, and the output characteristic value is decreased to a lower limit Ld, the micro control unit 130 controls the supply device 110 to supply a first predetermined quantity of the reactant to the reaction tank 120. The lower limit Ld could be set according to a requirement in the fuel cell system 100 (for example, a rated voltage, a rated current, a rated power, etc.), and when the requirement in the fuel cell system 100 is different, the lower limit Ld could be correspondingly adjusted, so that the fuel cell system 100 could match the requirement. Moreover, the first predetermined quantity could also be set according to the requirement in the fuel cell system 100, for example, regarding the fuel cell system 100 required to output a large power, the first predetermined quantity is relatively large, so as to achieve a large reaction rate of the fuel cell system 100. Those skilled in the art should understand that the first predetermined quantity and the lower limit Ld could be set and adjusted according to different specifications of the fuel cell system 100, so as to match different usage requirements.

Moreover, in an embodiment of the invention, when the fuel cell system operates in the first mode, and the first predetermined quantity of the reactant is supplied to the reaction tank 120, if a subsequent peak of the output characteristic value is smaller than a default value O1, the micro control unit 130 switches the fuel cell system 100 from the first mode to the second mode or form the first mode to the third mode, where as that shown in FIG. 2, the default value O1 is greater than the lower limit Ld. The supply device 110 respectively supplies the first predetermined quantity of the reactant to the reaction tank 120 at time points $T_0$, $T_1$, $T_2$, $T_3$ and $T_4$. The subsequent peaks of the output characteristic value corresponding to the time points $T_0$, $T_1$, $T_2$ and $T_3$ are all greater than the default value O1, and the subsequent peak P of the output characteristic value corresponding to the time points $T_4$ is smaller than the default value O1. When the micro control unit 130 determines that the subsequent peak P is smaller than the default value O1, the micro control unit 130 switches the fuel cell system 100 from the first mode to the second mode or from the first mode to the third mode.

Figure 3:
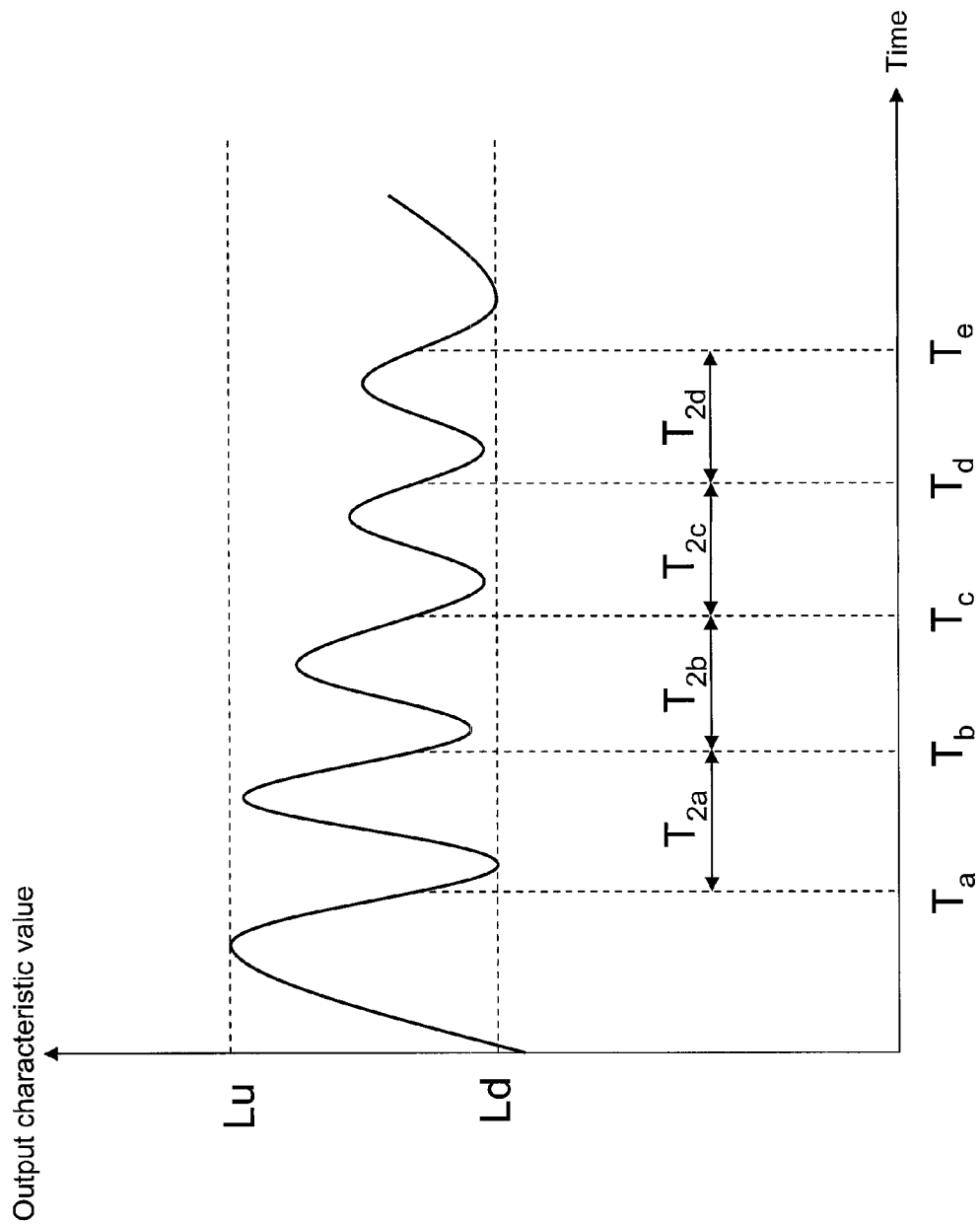
FIG. 3 is a relationship diagram of an output characteristic value versus time when a fuel cell system operates in a second mode according to an embodiment of the invention.

Referring to FIG. 3 and FIG. 1, FIG. 3 is a relationship diagram of the output characteristic value versus time when the fuel cell system 100 operates in the second mode according to an embodiment of the invention. A horizontal axis of FIG. 3 represents the time, and a vertical axis of FIG. 3 represents the output characteristic values detected by the detection unit 140. When the fuel cell system 100 operates in the second mode, the micro control unit 130 controls the supply device 110 to supply the reactant of a second predetermined quantity to the reaction tank 120 in a variable supply rate. The second predetermined quantity is determined according to the requirement in the fuel cell system 100. The second predetermined quantity is relatively large for the fuel cell system 100 outputting a large power. Those skilled in the art should understand that the second predetermined quantity could be set and adjusted according to different specifications of the fuel cell system 100, so as to match different usage requirements.

As described above, the micro control unit 130 controls the supply device 110 to supply the second predetermined quantity of the reactant to the reaction tank 120 at the variable supply rate. Referring to FIG. 3 for a description of "the variable supply rate", as shown in FIG. 3, the supply device 110 respectively supplies the reactant of the second predetermined quantity to the reaction tank 120 at time points $T_a$, $T_b$, $T_c$, $T_d$ and $T_e$. Time intervals $T_{2a}$, $T_{2b}$, $T_{2c}$ and $T_{2d}$ between the time points $T_a$, $T_b$, $T_c$, $T_d$ and $T_e$ are not necessarily equivalent. Therefore, when the fuel cell system 100 operates in the second mode, the supply rate that the supply device 110 supplies the reactant to the reaction tank 120 is variable.

In an embodiment of the invention, when the fuel cell system 100 operates in the second mode, and an average of the output characteristic value is greater than an upper limit Lu, the micro control unit 130 controls the supply device 110 to decrease a supply rate of the reactant. After the supply device 110 decreases the supply rate of the reactant, a time interval between two adjacent operations of supplying the reactant to the reaction tank 120 is prolonged, so as to decrease a reaction speed of the reactant. Moreover, in an embodiment, when the fuel cell system 100 operates in the second mode, and an average of the output characteristic value is smaller than the lower limit Ld, the micro control unit 130 controls the supply device 110 to increase the supply rate of the reactant. After the supply device 110 increases the supply rate of the reactant, a time interval between two adjacent operations of supplying the reactant to the reaction tank 120 is shortened, so as to increase the reaction speed of the reactant.

Figure 4:
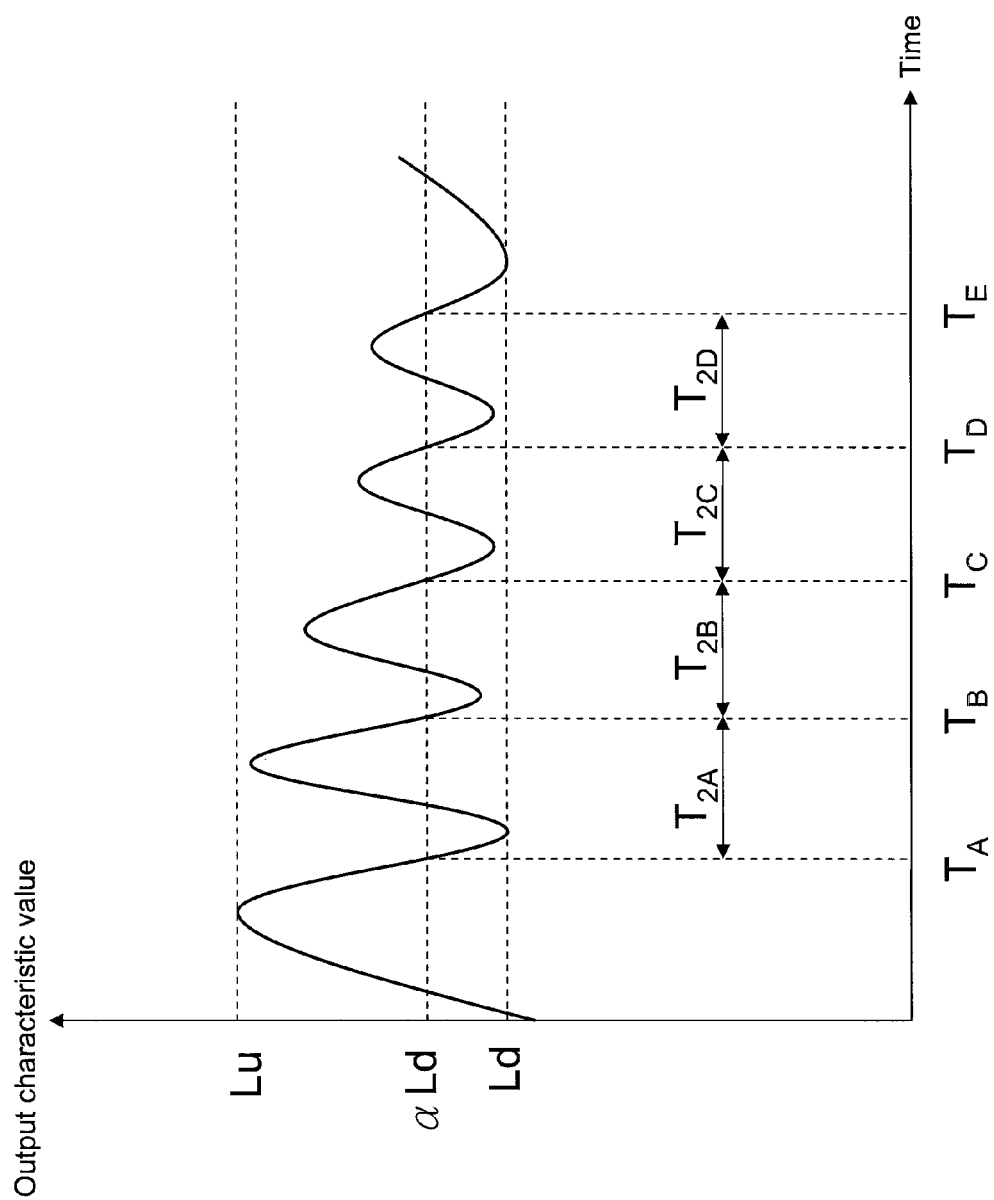
FIG. 4 is a relationship diagram of an output characteristic value versus time when a fuel cell system operates in a second mode according to an embodiment of the invention.

Referring to FIG. 4 and FIG. 1, FIG. 4 is a relationship diagram of the output characteristic value versus time when the fuel cell system 100 operates in the second mode according to an embodiment of the invention. A horizontal axis of FIG. 4 represents the time, and a vertical axis of FIG. 4 represents the output characteristic values detected by the detection unit 140. In the embodiment, when the fuel cell system 100 operates in the second mode, and the output characteristic value is decreased to $\alpha$ times of the lower limit Ld, the micro control unit 130 controls the supply device 100 to supply the reactant of the second predetermined quantity to the reaction tank 120, where $\alpha$ is greater than one. Referring to FIG. 4, the output characteristic value is respectively decreased to $\alpha$Ld at time points $T_A$, $T_B$, $T_C$, $T_D$ and $T_E$, and the supply device 110 respectively supplies the reactant of the second predetermined quantity to the reaction tank 120 at the time points $T_A$, $T_B$, $T_C$, $T_D$ and $T_E$. Time intervals $T_{2A}$, $T_{2B}$, $T_{2C}$ and $T_{2D}$ between the time points $T_A$, $T_B$, $T_C$, $T_D$ and $T_E$ are not necessarily equivalent.

In an embodiment of the invention, when the fuel cell system 100 operates in the second mode, if a time interval between two adjacent operations that the supply device 110 supplies the reactant of the second predetermined quantity to the reaction tank 120 is smaller than a predetermined period, the micro control unit 130 switches the fuel cell system 100 from the second mode to the first mode or from the second mode to the third mode. The predetermined period is, for example, 30 seconds, though the invention is not limited thereto. Those skilled in the art should understand that the above predetermined period could be set and adjusted according to different specifications of the fuel cell system 100, so as to match different usage requirements.

In an embodiment of the invention, when the fuel cell system 100 operates in the third mode, the micro control unit 130 controls the supply device 110 to supply a non-fixed quantity of the reactant to the reaction tank 120 at a variable supply rate. The "variable supply rate" is as that described in the aforementioned embodiment, so that details thereof are not repeated. Moreover, the non-fixed quantity refers to that when the fuel cell system 100 operates in the third mode, a quantity of the reactant supplied to the reaction tank 120 by the supply device 110 in each time is non-fixed. In an embodiment of the invention, the non-fixed quantity could be greater than the aforementioned second predetermined quantity, so as to increase the reaction speed of the reactant.

In an embodiment of the invention, during a period when the fuel cell system 100 operates in the third mode, if the number of times for supplying the reactant to the reaction tank 120 exceeds a predetermined number of times, the micro control unit 130 switches the fuel cell system 100 from the third mode to the first mode or from the third mode to the second mode.

It should be noticed that a switching mechanism of the fuel cell system 100 between the various modes is not limited to the aforementioned implementation, and those skilled in the art should understand that the switching mechanism between the first mode, the second mode and the third mode can be adjusted according to an actual requirement.

Figure 5:
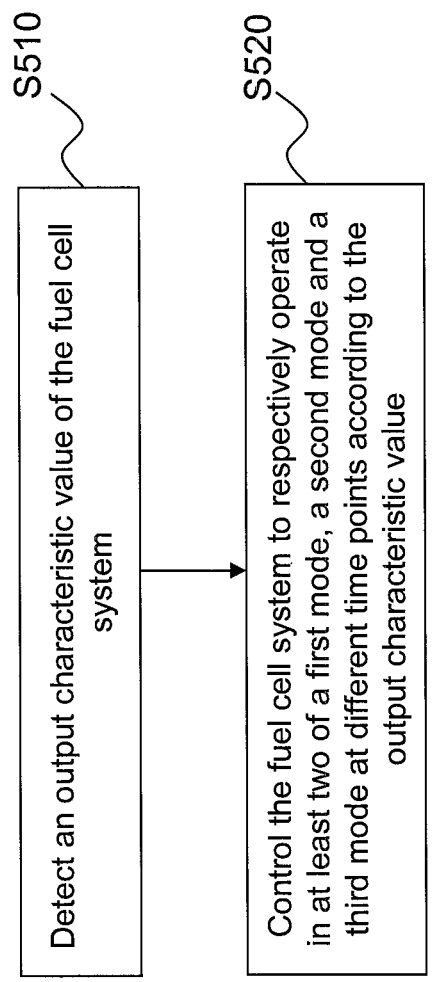
FIG. 5 is a flowchart illustrating a method for controlling a fuel cell system according to an embodiment of the invention.

Referring to FIG. 5, FIG. 5 is a flowchart illustrating a method for controlling the fuel cell system 100 according to an embodiment of the invention. In step S510, the detection unit 140 detects the output characteristic value of the fuel cell system 100. In step S520, the micro control unit 130 controls the fuel cell system 100 to respectively operate in at least two of the first mode, the second mode, and the third mode at different time points according to the output characteristic value.

Figure 6:
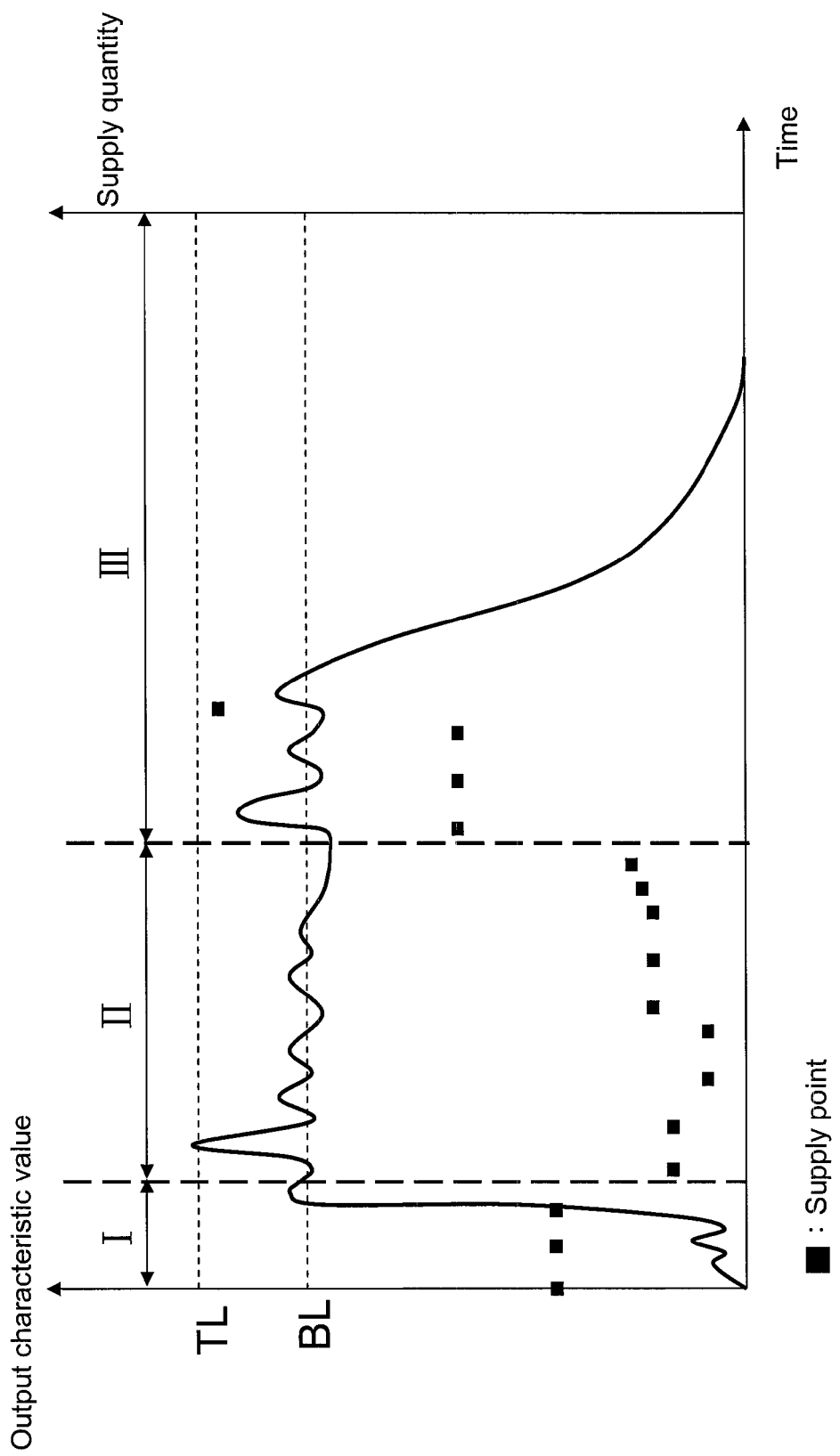
FIG. 6 is a relationship diagram of an output characteristic value of a fuel cell system versus time according to an embodiment of the invention.
Figure 7:
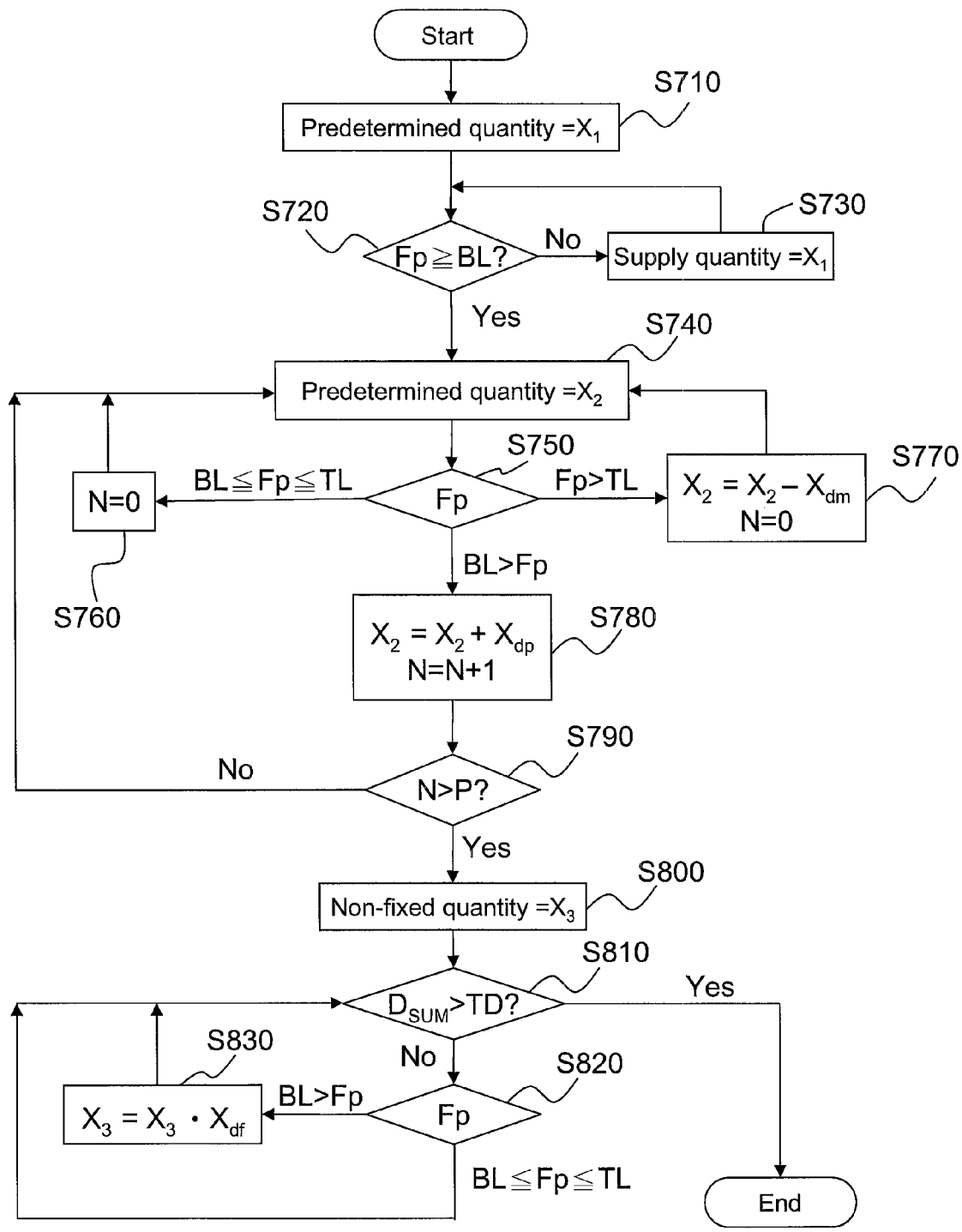
FIG. 7 is a flowchart illustrating a method for controlling a fuel cell system according to an embodiment of the invention.

Referring to FIG. 6, FIG. 7 and FIG. 1, FIG. 6 is a relationship diagram of the output characteristic value of the fuel cell system 100 versus time according to an embodiment of the invention. FIG. 7 is a flowchart illustrating a method for controlling the fuel cell system 100 according to an embodiment of the invention. A horizontal axis of FIG. 6 represents the time, and a vertical axis of FIG. 6 represents the output characteristic values detected by the detection unit 140 or a supply quantity of the reactant, in which each point indicated by a mark "■" represents an operation of supplying the reactant to the reaction tank 120, and a horizontal coordinate corresponding to each mark "■" represents a time point for supplying the reactant, and a vertical coordinate corresponding to each mark "■" represents a supply quantity of the reactant. In the embodiment, the fuel cell system 100 also includes the supply device 110, the reaction tank 120, the micro control unit 130, and the detection unit 140. The micro control unit 130 controls the fuel cell system 100 to respectively operate in the first mode I, the second mode II, and the third mode III at different time points according to the output characteristic value detected by the detection unit 140. In the following descriptions, the output characteristic value is represented by Fp. In the embodiment, although the fuel cell system 100 sequentially operates in the first mode I, the second mode II and the third mode III, those skilled in the art should understand that a time sequence that the fuel cell system 100 operates in various modes can be adjusted according to an actual requirement.

In an embodiment of the invention, when the output characteristic value Fp is smaller than the lower limit BL, the micro control unit 130 controls the supply device 110 to immediately supply the reactant to the reaction tank 120.

When the fuel cell system 100 operates in the first mode I, the micro control unit 130 sets the quantity of the reactant supplied to the reaction tank 120 by the supply device 110 in each time to be a first predetermined quantity $X_1$ (step S710). Then, in step S720, the micro control unit 130 determines whether the output characteristic value Fp is greater than or equal to the lower limit BL. If the output characteristic value Fp does not reach the lower limit BL, the micro control unit 130 controls the supply device 100 to supply the reactant of the first predetermined quantity $X_1$ to the reaction tank 120 in a first supply rate (step S730). If it is determined that the output characteristic value Fp reaches the lower limit BL in the step S720, the micro control unit 130 switches the fuel cell system 100 from the first mode I to the second mode II.

When the fuel cell system 100 operates in the second mode II, the micro control unit 130 sets the quantity of the reactant supplied to the reaction tank 120 by the supply device 110 in each time to be a second predetermined quantity $X_2$ (step S740). Then, in step S750, the micro control unit 130 determines whether the output characteristic value Fp is between the upper limit TL and the lower limit BL, and controls the supply device 110 to vary the quantity of the reactant supplied to the reaction tank according to a determination result. In detail, if it is determined that the output characteristic value Fp is between the upper limit TL and the lower limit BL in the step S750, an accumulated parameter N is set to 0 (step S760). If it is determined that the output characteristic value Fp is greater than the upper limit TL in the step S750, the micro control unit 130 controls the supply device 110 to decrease the quantity of the reactant supplied to the reaction tank 120, and sets the accumulated parameter N to 0 (step S770). In an embodiment of the invention, when the quantity of the reactant supplied to the reaction tank 120 is decreased in the step S770, the new second predetermined quantity $X_2$ is set to be equal to the original second predetermined quantity $X_2$ minus a predetermined quantity $X_{dm}$. Moreover, in an embodiment of the invention, when the quantity of the reactant supplied to the reaction tank 120 is decreased in the step S770, a rate of supplying the reactant to the reaction tank 120 is also decreased, i.e. the time interval between two adjacent operations of supplying the reactant to the reaction tank 120 is prolonged.

If it is determined that the output characteristic value Fp is smaller than the lower limit BL in the step S750, the micro control unit 130 controls the supply device 110 to increase the quantity of the reactant supplied to the reaction tank 120, and accumulates the accumulated parameter N by 1 (step S780). In an embodiment of the invention, when the quantity of the reactant supplied to the reaction tank 120 is increased in the step S780, the new second predetermined quantity $X_2$ is set to be equal to the original second predetermined quantity $X_2$ plus a predetermined quantity $X_{dp}$. Moreover, in an embodiment of the invention, when the quantity of the reactant supplied to the reaction tank 120 is increased in the step S780, a rate of supplying the reactant to the reaction tank 120 is also increased, i.e. the time interval between two adjacent operations of supplying the reactant to the reaction tank 120 is shortened.

Moreover, when the fuel cell system 100 operates in the second mode II, if the output characteristic value Fp is still smaller than the lower limit BL after the reactant is supplied to the reaction tank 120 for multiple times, the micro control unit 130 switches the fuel cell system 100 from the second mode II to the third mode III. Regarding the embodiment of FIG. 7, the micro control unit 130 executes a step S790 to determine whether the accumulated parameter N is greater than a predetermined times P. If the accumulated parameter N is greater than the predetermined times P, it represents that the output characteristic value Fp is still smaller than the lower limit BL after the reactant is supplied to the reaction tank 120 for multiple times, and now the micro control unit 130 switches the fuel cell system 100 from the second mode II to the third mode III. It should be noticed that an initial value of the accumulated parameter N is 0.

When the fuel cell system 100 operates in the third mode III, the micro control unit 130 sets the quantity of the reactant supplied to the reaction tank 120 by the supply device 110 in each time to be a non-fixed quantity $X_3$ (step S800). Generally, the non-fixed quantity $X_3$ is greater than the second predetermined quantity $X_2$. Then, in step S810, the micro control unit 130 determines whether a total quantity $D_{SUM}$ of the reactant supplied to the reaction tank 120 reaches a predetermined maximum supply quantity TD, and controls the supply device 110 to stop supplying the reactant to the reaction tank 120 when the total quantity $D_{SUM}$ reaches the predetermined maximum supply quantity TD. Moreover, if the micro control unit 130 determines that the total quantity $D_{SUM}$ of the reactant supplied to the reaction tank 120 does not reach the predetermined maximum supply quantity TD in the step S810, a step S820 is executed. In the step S820, the micro control unit 130 determines whether the output characteristic value Fp is between the upper limit TL and the lower limit BL, and controls the supply device 110 to vary the quantity of the reactant supplied to the reaction tank 120 according to a determination result. In detail, if it is determined that the output characteristic value Fp is between the upper limit TL and the lower limit BL in the step S820, return to the step S810. If it is determined that the output characteristic value Fp is smaller than the lower limit BL in the step S820, the micro control unit 130 controls the supply device 110 to increase the quantity of the reactant supplied to the reaction tank 120 (step S830). In an embodiment of the invention, when the quantity of the reactant supplied to the reaction tank 120 is increased in the step S830, the new non-fixed quantity $X_3$ is set to be equal to $X_{df}$ times of the original non-fixed quantity $X_3$, where the multiple $X_{df}$ is greater than one.

Those skilled in the art should understand that the upper limit TL, the lower limit BL, the first predetermined quantity $X_1$, the second predetermined quantity $X_2$, the non-fixed quantity $X_3$, the predetermined times P, the predetermined maximum supply quantity TD, the predetermined quantity $X_{dm}$, the predetermined quantity $X_{dp}$ and the multiple $X_{df}$ can be set and adjusted according to different specifications of the fuel cell system 100, so as to match different usage requirements. Moreover, the fuel cell system 100 of FIG. 6 and FIG. 7 could be a PEMFC system or a DMFC system.

In summary, in the aforementioned embodiments, the micro control unit of the fuel cell system controls a rate and quantity of the supplied reactant according to the detected output characteristic value of the fuel cell system. In this way, the output of the fuel cell system is stabilized without valves, so as to save a fabrication cost. Moreover, the micro control unit controls the fuel cell system to respectively operate in at least two of the first mode, the second mode, and the third mode at different time points according to the output characteristic value, so that the fuel cell system can stably react to generate the electric power, and is adapted to different operation environments.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for controlling a fuel cell system, comprising:
    detecting an output characteristic value of the fuel cell system; and
    controlling the fuel cell system to respectively operate in at least two of a first mode, a second mode, and a third mode at different time points according to the output characteristic value,
    wherein when the fuel cell system operates in the first mode, and the output characteristic value is decreased to a lower limit, a first predetermined quantity of a reactant is supplied to a reaction tank of the fuel cell system,
    wherein when the fuel cell system operates in the second mode, a second predetermined quantity of the reactant is supplied to the reaction tank at a variable supply rate,
    wherein when the fuel cell system operates in the third mode, a non-fixed quantity of the reactant is supplied to the reaction tank at the variable supply rate,
    wherein the non-fixed quantity is greater than the second predetermined quantity.

2. The method for controlling the fuel cell system as claimed in claim 1, wherein the fuel cell system is a proton exchange membrane fuel cell (PEMFC) system, the reactant reacts with a fuel in the reaction tank to generate a reaction gas, the fuel cell system further comprises a stack for reacting with the reaction gas to generate electric power, and the output characteristic value is a temperature of the fuel cell system, a flux of the reaction gas, a pressure of the reaction gas, an output current of the stack or an output voltage of the stack.

3. The method for controlling the fuel cell system as claimed in claim 1, wherein the fuel cell system is a direct methanol fuel cell (DMFC) system, the reactant is methanol, and the output characteristic value is a temperature of the fuel cell system, an output current of the fuel cell system or an output voltage of the fuel cell system.

4. The method for controlling the fuel cell system as claimed in claim 1, wherein when the fuel cell system operates in the first mode and the reactant of the first predetermined quantity is supplied to the reaction tank, if a subsequent peak of the output characteristic value is smaller than a default value, the fuel cell system is switched from the first mode to the second mode or the third mode, wherein the default value is greater than the lower limit.

5. The method for controlling the fuel cell system as claimed in claim 1, wherein when the fuel cell system operates in the second mode, and an average of the output characteristic value is greater than an upper limit, the supply rate is decreased, and when the fuel cell system operates in the second mode, and the average of the output characteristic value is smaller than the lower limit, the supply rate is increased.

6. The method for controlling the fuel cell system as claimed in claim 1, wherein when the fuel cell system operates in the second mode and the output characteristic value is decreased to a times of the lower limit, the second predetermined quantity of the reactant is supplied to the reaction tank, wherein a is greater than one.

7. The method for controlling the fuel cell system as claimed in claim 1, wherein when the fuel cell system operates in the second mode, if a time interval between two adjacent operations of supplying the second predetermined quantity of the reactant to the reaction tank is smaller than a predetermined period, the fuel cell system is switched from the second mode to the third mode.

8. A fuel cell system, comprising:
    a reaction tank, adapted for a reactant to react therein;
    a supply device, supplying the reactant to the reaction tank;
    a detection unit, detecting an output characteristic value of the fuel cell system; and
    a micro control unit, coupled to the supply device and the detection unit, and programmed to control the fuel cell system to respectively operate in at least two of a first mode, a second mode, and a third mode at different time points according to the output characteristic value detected by the detection unit,
    wherein when the fuel cell system operates in the first mode, and the output characteristic value is decreased to a lower limit, the micro control unit is programmed to control the supply device to supply a first predetermined quantity of the reactant to the reaction tank,
    wherein when the fuel cell system operates in the second mode, the micro control unit is programmed to control the supply device to supply a second predetermined quantity of the reactant to the reaction tank at a variable supply rate,
    wherein when the fuel cell system operates in the third mode, the micro control unit is programmed to control the supply device to supply a non-fixed quantity of the reactant to the reaction tank at the variable supply rate,
    wherein the non-fixed quantity is greater than the second predetermined quantity.

9. The fuel cell system as claimed in claim 8, wherein the fuel cell system is a proton exchange membrane fuel cell (PEMFC) system, the reactant reacts with a fuel in the reaction tank to generate a reaction gas, the fuel cell system further comprises a stack for reacting with the reaction gas to generate electric power, and the output characteristic value is a temperature of the fuel cell system, a flux of the reaction gas, a pressure of the reaction gas, an output current of the stack or an output voltage of the stack.

10. The fuel cell system as claimed in claim 8, wherein the fuel cell system is a direct methanol fuel cell (DMFC) system, the reactant is methanol, and the output characteristic value is a temperature of the fuel cell system, an output current of the fuel cell system or an output voltage of the fuel cell system.

11. The fuel cell system as claimed in claim 8, wherein when the fuel cell system operates in the first mode, and the first predetermined quantity of the reactant is supplied to the reaction tank, if a subsequent peak of the output characteristic value is smaller than a default value, the micro control unit is programmed to switch the fuel cell system from the first mode to the second mode or the third mode, and the default value is greater than the lower limit.

12. The fuel cell system as claimed in claim 8, wherein when the fuel cell system operates in the second mode, and an average of the output characteristic value is greater than an upper limit, the micro control unit is programmed to control the supply device to decrease the supply rate, and when the fuel cell system operates in the second mode, and the average of the output characteristic value is smaller than the lower limit, the micro control unit is programmed to control the supply device to increase the supply rate.

13. The fuel cell system as claimed in claim 8, wherein when the fuel cell system operates in the second mode, and the output characteristic value is decreased to a times of the lower limit, the micro control unit is programmed to control the supply device to supply the second predetermined quantity of the reactant to the reaction tank, wherein $\alpha$ is greater than one.

14. The fuel cell system as claimed in claim 8, wherein when the fuel cell system operates in the second mode, if a time interval between two adjacent operations that the supply device supplies the second predetermined quantity of the reactant to the reaction tank is smaller than a predetermined period, the micro control unit is programmed to switch the fuel cell system from the second mode to the third mode.

\* \* \* \* \*